United States Patent
Senga

(10) Patent No.: US 7,417,551 B2
(45) Date of Patent: Aug. 26, 2008

(54) PHOTOGRAPHIC SUBJECT AUTHENTICATING DEVICE, PORTABLE TELEPHONE, PHOTOGRAPHIC SUBJECT AUTHENTICATING METHOD AND PHOTOGRAPHIC SUBJECT AUTHENTICATING PROGRAM

(75) Inventor: Masahiro Senga, Kyoto (JP)

(73) Assignee: OMRON Corporation, Kyoto (JP)

( * ) Notice: Subject to any disclaimer, the term of this patent is extended or adjusted under 35 U.S.C. 154(b) by 319 days.

(21) Appl. No.: 11/374,370

(22) Filed: Mar. 13, 2006

(65) Prior Publication Data

US 2006/0208882 A1    Sep. 21, 2006

(30) Foreign Application Priority Data

Mar. 15, 2005   (JP)   ............................. 2005-074033

(51) Int. Cl.
   *G08B 23/00*   (2006.01)
(52) U.S. Cl. .................... 340/573.1; 340/5.81; 340/5.83
(58) Field of Classification Search ................. 340/500, 340/502, 517, 573.1, 573.5, 573.7, 5.52, 340/5.53, 5.8, 5.81, 5.82, 5.83; 455/411; 713/186
   See application file for complete search history.

(56) References Cited

U.S. PATENT DOCUMENTS

| 5,229,764 | A | 7/1993 | Matchett et al. | |
| 6,583,723 | B2* | 6/2003 | Watanabe et al. | 340/573.1 |
| 6,686,844 | B2* | 2/2004 | Watanabe et al. | 340/573.1 |
| 6,867,683 | B2* | 3/2005 | Calvesio et al. | 340/5.52 |
| 7,091,826 | B2* | 8/2006 | Hayakawa | 340/5.82 |
| 2004/0218070 | A1 | 11/2004 | Hamalainen | |
| 2005/0170812 | A1* | 8/2005 | Kim | 455/411 |

FOREIGN PATENT DOCUMENTS

| CN | 1122930 A | 5/1996 |
| EP | 1521161 | 4/2005 |
| JP | 2004-276783 | 10/2004 |
| WO | WO-99/56494 | 11/1999 |

OTHER PUBLICATIONS

Patent Abstracts of Japan, Publication No. 2004-276783, Publication Date: Oct. 7, 2004, 1 page.

(Continued)

*Primary Examiner*—Van T. Trieu
(74) *Attorney, Agent, or Firm*—Osha• Liang LLP

(57) ABSTRACT

A photographic subject authenticating device, a portable telephone, a photographic subject authenticating method and a photographic subject authenticating program are able to improve reliability of security with respect to disguise, and restrain electric power consumption. A controller of a photographic subject authenticating device for performing authentication processing for authenticating a photographic subject based on a photographic image provided by photographing the photographic subject is constructed so as to execute authentication repeating processing for also repeatedly executing the authentication processing after it is judged as in conformity by the authentication processing; repeating stoppage instruction receiving processing for receiving repeating stoppage instructions for stopping the repetition of the authentication processing by an input device; true and false judgment processing for comparing the received repeating stoppage instructions with normal instructions registered in advance, and making true and false judgments; and repeating stoppage processing for stopping the authentication repeating processing when the judging result of the true and false judgment processing is true.

15 Claims, 4 Drawing Sheets

OTHER PUBLICATIONS

European Search Report dated Aug. 4, 2006; Application No. 06111119.1 (8 pages).

Linlin Shen et al.; "Facial Recognition/Verification Using Gabor Wavelets and Kernel Methods"; Image Processing, 2004. ICIP '04. 2004 International Conference on Singapore Oct. 24-27, 2004 (4 pages).

Chinese Office Action issued in Chinese Application No. 200610059203.3 mailed on Aug. 3, 2007 and English translation thereof, 14 pages.

* cited by examiner

PHOTOGRAPHIC SUBJECT AUTHENTICATING DEVICE, PORTABLE TELEPHONE, PHOTOGRAPHIC SUBJECT AUTHENTICATING METHOD AND PHOTOGRAPHIC SUBJECT AUTHENTICATING PROGRAM

BACKGROUND OF THE INVENTION

1. Technical Field

This invention relates to a photographic subject authenticating device, a portable telephone, a photographic subject authenticating method and a photographic subject authenticating program for photographing a photographic subject such as the face of a person, the iris, a palm print, etc. and authenticating the photographic subject.

2. Background Art

Various kinds of authenticating systems such as a face authenticating system for photographing and authenticating the face, an iris authenticating system for photographing and authenticating the iris, a palm print authenticating system for photographing and authenticating the palm print of a hand, etc. are conventionally proposed as a system for authenticating the person in question.

In these authenticating systems, the photographic subject such as the face, the eye or the hand is photographed and authenticated. These systems are mounted to various devices such as a personal computer, a portable information terminal, an ATM or a vehicle, etc., and can be practically used.

However, for example, when disguise using a photograph, etc. is performed and an authenticating result is once conformed, a problem exists in that all subsequent use and operations of the device are allowed since it is the person in question.

A vehicle monitor for improving reliability of security is proposed to solve this problem (see patent literature 1). This vehicle monitor again performs the authentication even when the image of a crew member is repeatedly acquired and the authenticating result is once conformed. Thus, for example, it is possible to detect the disguise in a mounting state of a person face mask.

However, in this vehicle monitor, a user must be repeatedly photographed in a state correctly authenticated. Therefore, the problem of being inconvenient for the user is left.

Further, it is impossible to cope with a case in which the person in question allows others to utilize the vehicle by obtaining consent of the person in question. For example, a problem also exists in that no driver of the vehicle can be changed.

[Patent literature 1] JP-A-2004-276783

SUMMARY OF THE INVENTION

In consideration of the above problems, an object of this invention is to provide a photographic subject authenticating device, a portable telephone, a photographic subject authenticating method and a photographic subject authenticating program able to reconcile securing of reliability of security with respect to the disguise, and the improvement of convenience property of a user.

This invention resides in a photographic subject authenticating method, a photographic subject authenticating device or a photographic subject authenticating program including photographing means for photographing a photographic subject, and performing authentication processing for authenticating the photographic subject on the basis of a photographing image provided by photographing the photographic subject by the photographing means;

the photographic subject authenticating method, the photographic subject authenticating device or the photographic subject authenticating program further including:

input means for receiving an input using the photographic subject; and control means for controlling the operations of these means;

wherein the control means is constructed so as to execute:

authentication repeating processing for also repeatedly executing the authentication processing after it is judged as conformity by the authentication processing;

repeating stoppage instruction receiving processing for receiving repeating stoppage instructions for stopping the repetition of the authentication processing by the input means;

true and false judgment processing for comparing the received repeating stoppage instructions with normal instructions registered in advance, and making true and false judgments; and repeating stoppage processing for stopping the authentication repeating processing when the judging result of the true and false judgment processing is true.

The above repeating processing can be constructed by processing for repeating the authentication processing in which the authentication processing is repeated in random timing, or is repeated in predetermined timing (a time interval, or a specific operation), etc.

The above repeating stoppage instructions and normal instructions are desirably constructed by input instructions able to perform the authentication by a system different from an authenticating system using the authentication processing such as a password input, a palm print input, a voiceprint input or an input of a word using a voice, etc.

In accordance with the above construction, the photographic subject can be repeatedly authenticated, and the disguise using a photograph, etc. can be set to be difficult. Namely, even when the disguise is once successful, the disguise must be successful many times in the repeated authentication processing so that the disguise becomes difficult.

Further, a user can stop the repetition of the authentication processing before a situation unable to receive the authentication of the person in question is attained. Accordingly, for example, when it is set to a construction for executing the authentication processing using the face collation in a portable telephone, no authentication processing is performed while telephonic communication is performed by holding the portable telephone to a user's ear. Thus, the telephonic communication can be continued.

As a mode of this invention, the above control means can be set to a construction for executing authentication restarting processing for restarting the above authentication repeating processing when a predetermined restarting condition is satisfied after the above repeating stoppage processing is executed.

The above predetermined restarting condition can be determined to a suitable condition in which a predetermined operation is performed, and a predetermined operation is executed, or a predetermined constant period has passed, etc.

Thus, after the repetition of the authentication processing is stopped, time and labor for restarting the repetition can be omitted, and it is possible to prevent that the state of the authentication processing stoppage is continued for a long period.

Further, as a mode of this invention, it is possible to set a construction for executing the above repeating stoppage instruction receiving processing after it is judged as conformity by the authentication processing.

Thus, it is possible to prevent that the repeating stoppage instructions are inputted and unfairly used before the authentication processing is performed. Accordingly, it is possible to reconcile securing of reliability of security and the improvement of convenient property.

Further, as a mode of this invention, the above authentication repeating processing can be set to a construction for irregularly repeating the above authentication processing.

Thus, it is possible to set a construction in which no unfair user can see through timing of the authentication processing. Accordingly, the disguise using a photograph, etc. can be set to be difficult. Namely, since the timing is irregular, it is difficult to hold up the photograph in conformity with the photographing timing of the authentication processing so that the disguise can be prevented.

Further, this invention can be set to a face authenticating device having the above photographic subject authenticating device and constructed so as to photograph a face as the photographic subject by the above photographing means.

Thus, a mental resistance feeling is little in comparison with a palm print, the iris, etc., and the disguise using the photograph can be appropriately excluded in face authentication easily accepted from a custom such as a nodding acquaintanceship, a face pass, etc.

Further, this invention can be set to a portable telephone having the above photographic subject authenticating device.

Thus, unfair use of the portable telephone can be prevented.

The securing of reliability of security with respect to the disguise and the improvement of convenient property of the user can be reconciled by this invention.

DESCRIPTION OF THE PREFERRED EMBODIMENTS

One embodiment mode of this invention will next be explained together with the drawings.

Figure 1:
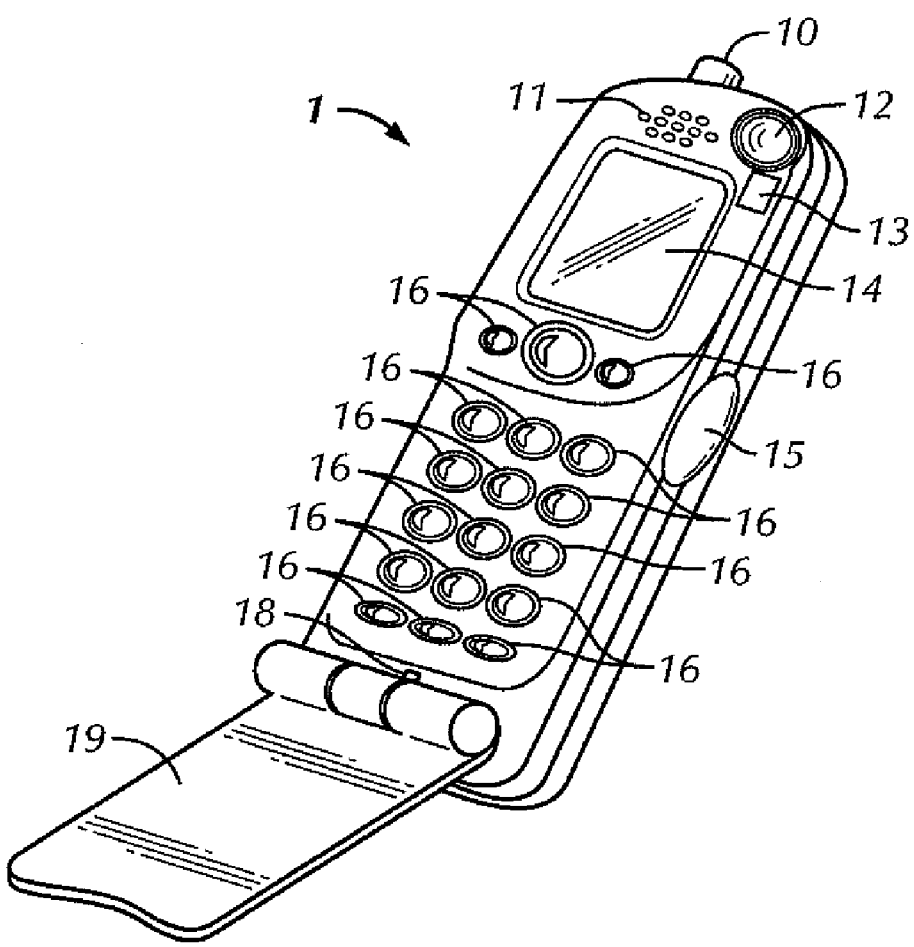
FIG. 1 is a perspective view of a photographic subject authenticating device.

First, the construction of a photographic subject authenticating device 1 of embodiment 1 will be explained together with the perspective view of the photographic subject authenticating device 1 shown in FIG. 1.

The photographic subject authenticating device 1 is constructed by a portable telephone as one kind of a portable information terminal. A speaker 11 of outputting a voice, a liquid crystal monitor 14 for displaying an image, plural operation buttons 16 for inputting operations, and a microphone 18 for inputting a voice are sequentially arranged from above on the front face of the photographic subject authenticating device 1.

A camera 12 and an illuminating device 13 for photographing are vertically proximately arranged on the right-hand transversal side of the above speaker 11. The camera 12 and the illuminating device 13 for photographing and the above liquid crystal monitor 14 are arranged on the same face (the surface in this embodiment mode) of the photographic subject authenticating device 1 such that a photographing direction of the camera 12, an illuminating direction of the illuminating device 13 and a display direction of the liquid crystal monitor 14 become the same direction. The above illuminating device 13 is constructed by a suitable illuminating device such as a flash illuminating device for emitting flash light, or a lighting illuminating device (e.g., a LED and a fluorescent lamp) lighted, etc.

A shutter button 15 of the camera 12 is arranged on the right-hand side face of the photographic subject authenticating device 1. An opening-closing cover 19 rotated forward and backward is pivotally mounted to the lower portion of the front face of the photographic subject authenticating device 1. The opening-closing cover 19 is constructed so as to cover and protect the plural operation buttons 16 in a closing state.

An antenna 10 for wireless communication is arranged in the upper portion of the rear face of the photographic subject authenticating device 1. A controller constructed by a CPU, a ROM and a RAM, and a battery charger for supplying operating electric power are arranged within the photographic subject authenticating device 1. A storing section is also arranged in this controller. A database for registering registration data for face collation as one kind of living body authentication, and normal operation data for true and false judgments of an input operation, and a photographic subject authenticating program for repeatedly executing the authentication using the face collation are stored into this storing section.

In accordance with the above construction, the operation button 16 is operated and electricity is supplied (a signal is transmitted) from the photographic subject authenticating device 1. Further, the photographic subject authenticating device 1 can receive an arriving signal by operating the operation button 16. Thus, voice telephonic communication with a telephone set of a remote place can be allowed. Further, it is possible to display contents by Internet connection and transmit and receive an electronic mail by operating the operation button 16.

The photographing of a static image and a dynamic image using the camera 12 can be executed, and a photographing image can be displayed in the liquid crystal monitor 14. The personal authentication of a photographic subject can be performed by the photographing image obtained in this photographing.

Figure 2:
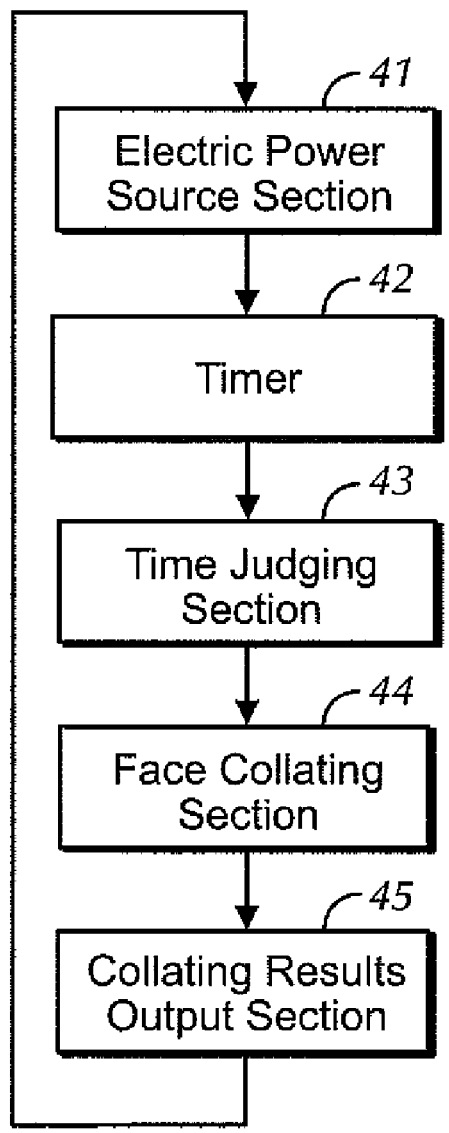
FIG. 2 is a block diagram showing the construction of the photographic subject authenticating device.

Next, the construction of the photographic subject authenticating device 1 will be explained together with the block diagram shown in FIG. 2. In this explanation, elements relating to a photographing function and an authenticating function required in the personal authentication will be explained, and the explanations of the other elements are omitted.

The photographic subject authenticating device 1 is constructed by an electric power source section 41, a timer 42, a time judging section 43, a face collating section 44, a collating result output section 45.

The above electric power source section 41 is constructed by a battery charger and an electric power button (one of the operation buttons 16 shown in FIG. 1), and supplies operating electric power to each constructional element by turning-on the electric power button.

The above timer 42 is constructed by a controller of the photographic subject authenticating device 1, and receives the supply of the operating electric power from the above electric power source section 41, and executes counting of time.

The above time judging section 43 receives the time counted by the above timer 42, and judges whether it is timing for executing the face collation or not. For example, this timing is determined by a time interval determined at random.

The above face collating section 44 is constructed by the controller of the photographic subject authenticating device 1 and the camera 12. The face collation of the photographing image acquired by the camera 12, and the registration data stored to the storing section of the controller is performed. It is then judged whether it is conformity (the same person) or not. These registration data are photographing image data of a user registered in advance. In this embodiment mode, a face image small in mental resistance with respect to the user is used. The registration data are not limited to the image data, but may be also constructed by characteristic data provided by extracting a characteristic point and a characteristic amount from these image data.

The above collating result output section 45 outputs one of conformity and unconformity as a result of the face collation, i.e., an authenticating result.

In accordance with the above construction, the face collation is irregularly repeated and is intermittently executed. Thus, it is possible to prevent that an unfair user continuously uses the photographic subject authenticating device 1 by the disguise.

Figure 3:
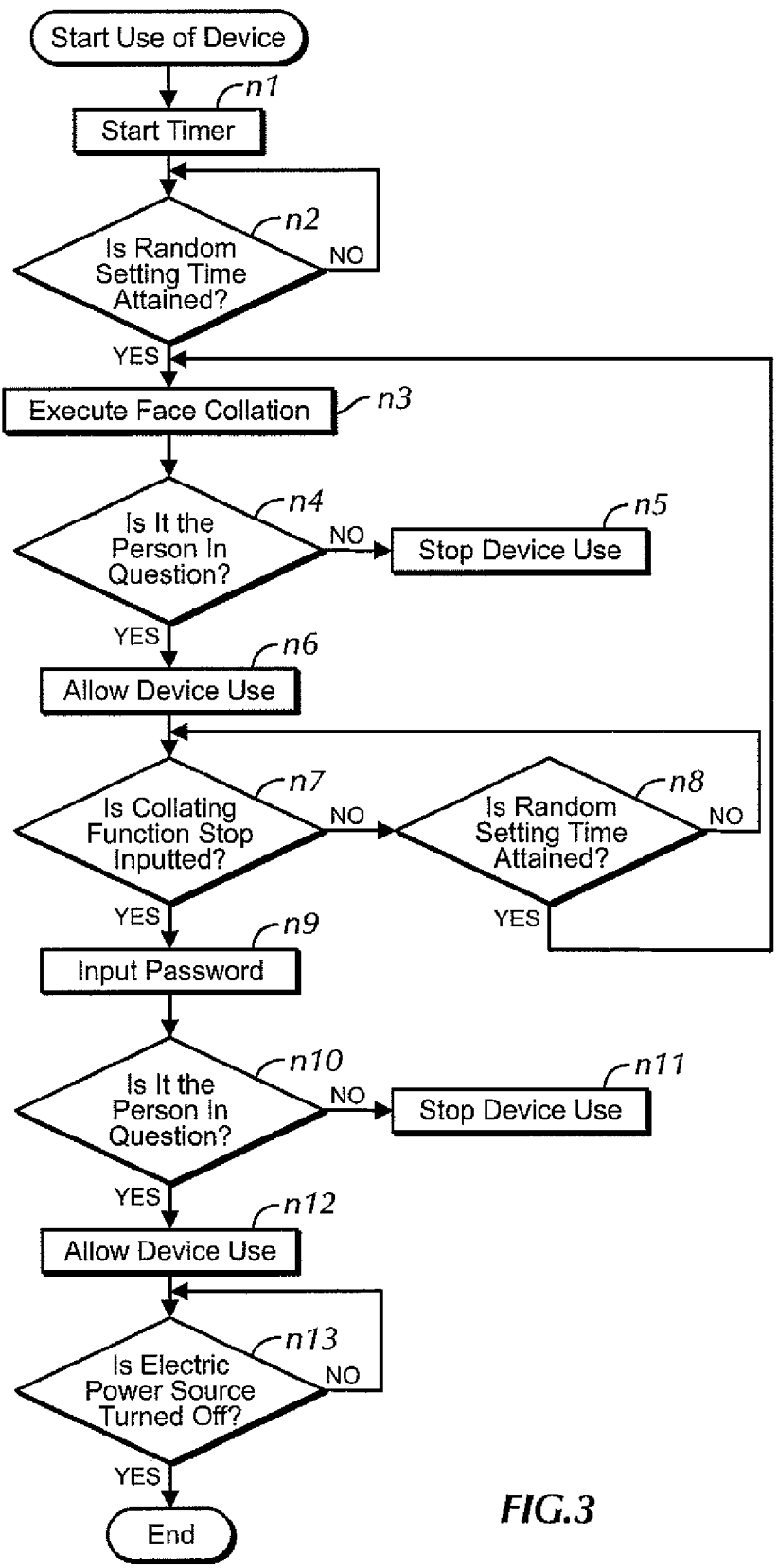
FIG. 3 is a flow chart showing an operation executed by a control section.

Next, the operation of repeating authentication processing executed by the controller using a photographic subject authenticating program will next be explained together with the flow chart showing an operation executed by the controller of the photographic subject authenticating device 1 shown in FIG. 3.

When the user starts the use of a portable telephone (photographic subject authenticating device 1), the controller starts the counting of the timer 42 (step n1).

The controller determines time for executing the face collation by the time judging section 43 at random. The controller then waits while allowing the normal use of the user until this time (collation execution timing) determined at random passes (step n2: No).

When the time determined at random has passed (step n2: Yes), the controller executes the photographing using the camera 12, and also executes the face collation using the photographing image acquired by this photographing, and the registration data by the face collating section 44 (step n3).

In the comparison of the face image data and the registration data in the face collation, a characteristic amount proper to the person in question is calculated from the photographing image, and is compared (collated) with the characteristic amount of the registration data. If the difference in the characteristic amount lies within a constant threshold value determined in advance, it is judged that it is the same person.

For example, the above characteristic amount proper to the person in question can be calculated by using Gabor wavelet transformation with respect to the characteristic point acquired from the face image of the photographing image. This characteristic point can be acquired by cutting-out a face portion from a rough position of the face and normalizing the size of the face and further applying a detailed graph and detecting the position of the characteristic point of the face in detail. The Gabor wavelet transformation is a technique used in signal analysis and image compression. In this technique, a wavelet waveform is utilized from a transformation object, and only a character (a frequency component, etc.) provided by this waveform is taken out.

When it is impossible to authenticate that it is the person in question as a result of the face collation (step n4: No), the collating result output section 45 outputs information of unconformity to the controller as the authenticating result. Thus, the controller stops the use of the device, i.e., the use of the portable telephone (step n5). For example, if an operation such as telephonic communication, a setting change, WEB communication, etc. is being operated, such an operation is stopped and a subsequent operation input is refused.

In this state, it is preferable to set a construction for allowing only an authenticating request operation for restarting of the use. For example, this authenticating request operation of the use restarting is set to a predetermined operation such as pushing-down of the shutter button 15, etc. When this authenticating request operation is received, the controller is constructed so as to execute the same face collation as the above step n3. If the result of the face collation is conformed, it is returned to the normal state and the processing is executed from step n1. In contrast to this, if the result of the face collation is unconformity, a state stopping the use of the portable telephone is maintained. The authentication (authentication for restarting) for this restarting may be also set to authentication except for the face collation, and may be also set to authentication using e.g., a password, a palm print, a voice, a word, etc.

If the result of the face collation is conformity (step n4: Yes), the collating result output section 45 outputs information of conformity to the controller as an authenticating result. Thus, the controller allows the use of the device, i.e., the use of the portable telephone (step n6). Accordingly, a user can continuously use the portable telephone, and can use the portable telephone without hindrance. Namely, if it is seen from the user, the above face collation is freely executed by the portable telephone. Therefore, the registered normal user can usually use the portable telephone without particularly being conscious of the face collation.

The controller outputs contents able to stop the repetition of the collation. If no contents for stopping the repeating collation are inputted by the user (step n7: No), time for executing the face collation is determined at random by the time judging section 43 and the controller waits until this time (collation executing timing) determined at random passes (step n8: No).

Here, the contents able to stop the repetition of the collation can be outputted by display using the liquid crystal monitor 14 or/and a voice output using the speaker 11. In the displaying case using the liquid crystal monitor 14, a selecting screen for selecting whether the repetition is stopped on the screen or not is displayed. Otherwise, it is possible to notify information by displaying an icon showing ability of the stoppage at a corner of the screen, etc.

The display and a voice guide of the contents able to stop the repetition may not be also executed. In this case, after a stopping function screen of the repeating collation is started by an operation of the user in a determined sequence, a selection for requiring the stoppage or requiring no stoppage may be also displayed. Thus, it is possible to set a construction in which no unfair user notices that the repeatedly executed authentication can be stopped. Thus, the disguise can be more reliably prevented.

If the time determined at random in the above step n8 has passed, it is returned to step n3.

When the contents of stoppage in the above step n7 are inputted (step n7: Yes), the controller performs an output for requesting a password input as repeating stoppage instructions, and receives the password input by the user (step n9). The output for requesting the password input can be performed by the display using the liquid crystal monitor 14, the voice output using the speaker 11, or both this display and this voice output. In the displaying case using the liquid crystal monitor 14, it is possible to notify password input waiting to the user by displaying a password input screen requesting the password input on the screen, or displaying an icon showing a password input state at a corner of the screen, etc.

When the password is inputted and an input completion input (e.g., pushing-down of an OK button, etc.) is performed, the controller judges whether this password is conformed to a password registered as normal instructions or not. Thus, it is judged whether it is the person in question or not (step n10).

If it is not the person in question, i.e., when the inputted password is incorrect (step n10: No), the use of the device, i.e., the use of the portable telephone is stopped (step n11), and the processing is terminated.

In contrast to this, when it is the person in question, i.e., when the inputted password is correct (step n10: Yes), the use of the device, i.e., the use of the portable telephone is continuously allowed (step n12).

The controller waits until the electric power source is turned off (step n13: No), and terminates the processing if the electric power source is turned off (step n13: Yes).

Figure 4:
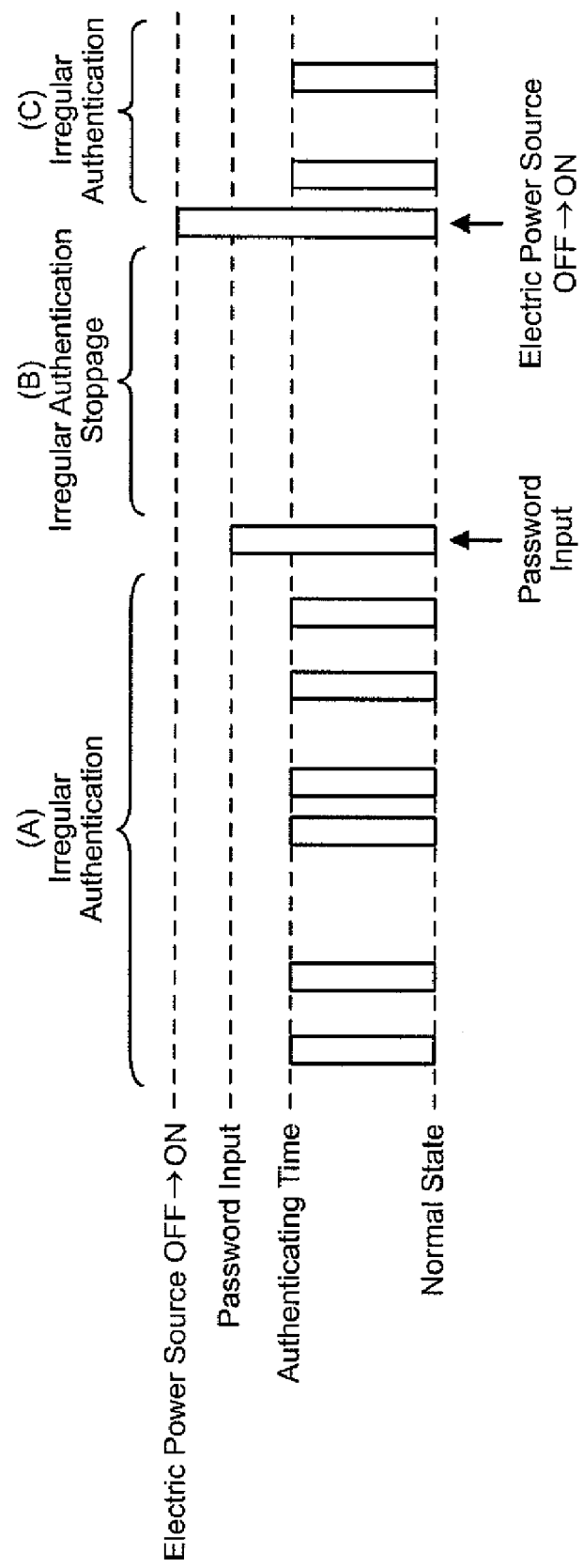
FIG. 4 is a timing chart of the photographic subject authenticating device.

As shown by (A) of the timing chart of FIG. 4, the authentication of the person in question using the face collation can be repeatedly executed irregularly by the above operation while the device is used.

When the user wants to stop the execution of the authentication of the person in question using the face collation, the user can stop the subsequent face collation by inputting the password. Thus, as shown by (B) of FIG. 4, the face collation is stopped. When the user performs the normal telephonic communication instead of a television telephone, it is possible to use the portable telephone in a state unable to perform the face collation, in which the portable telephone is held to a user's ear. Further, it is possible to restrain that the electric power of the battery charger is consumed by repeating the authentication processing by this stoppage.

The stoppage of the face collation using the password input is constructed so as not to be executed unless after the face collation is performed at least once. Therefore, it is possible to prevent that only the password is broken and the device is unfairly used.

The face collation is repeatedly irregularly executed without notifying this execution beforehand to the user. Therefore, timing of this face collation, i.e., photographing timing is not known by the unfair user so that the disguise can be excluded.

If the electric power source is turned off, the processing is started from step n1 at the using time of the device after the electric power source is next turned on. As shown by (C) of FIG. 4, the irregular face collation is restarted. Therefore, it is possible to prevent that a long period has passed in a stopping state of the face collation.

In the above embodiment mode, it is set to the construction for executing the authentication processing if the use of the device is started. However, it may be also set to a construction for allowing the use without performing the face collation at a signal arriving time. Thus, the user noticing the signal arrival can make a telephone call without performing an operation of the stoppage of a collating function. When only voice telephonic communication is performed instead of the use of the portable telephone as in a television telephone, the continuation of the telephonic communication can be allowed even in a state in which no face image is obtained by holding the portable telephone to a user's ear so that convenient property of the user is improved.

Further, it may be also set to a construction in which the face collation is executed in an electricity supplying operation at an electricity supplying time, and the password can be inputted if it is judged as conformity, and electricity is then supplied. Thus, when the voice telephonic communication is performed, the user inputs the password and stops the repeating authentication, and can perform the telephonic communication. Accordingly, it is possible to prevent that the repeating authentication is executed during the voice telephonic communication and the use of the portable telephone is inhibited. It is also possible to prevent that the telephonic communication is interrupted by this use inhibition. When the voice telephonic communication and the transmission and reception of a screen image are performed as the television telephone, the telephonic communication can be performed while receiving the repeating authentication even when no user inputs the password.

The restarting of the face collation is not limited to turning-on of the electric power source after the electric power source is turned off, but may be also set to constructions in which the face collation is restarted when a constant time (e.g., 0 a.m. every day, every one hour, etc.) set on the setting screen has passed, and the face collation is restarted at the next using time after the use of the user is terminated. Here, the use can include the use of the telephonic communication, the use of WEB perusal, the use of mail transmission and reception, the use of a setting change, etc. Thus, it is possible to more reliably prevent that the stopping state of the face collation is continued for a long period.

Further, an input means (e.g., a button for selecting and operating a button for the face collation, or a face collation button displayed in the liquid crystal monitor 14) for receiving a face collation executing input may be also arranged so as to immediately stop the repetition of the authentication. In this case, the face collation and the password input can be executed in arbitrary timing without waiting the face collation irregularly performed, and the irregular collation can be stopped.

The photographic subject authenticating device 1 is not limited to the case constructed by the portable telephone, but can be set to a suitable construction such as a construction using another portable information terminal such as a PDA, a note type personal computer, etc., or a construction using another device such as a desk top type personal computer, an ATM, etc. In this case, the face collation can be also repeatedly executed by using a camera, etc. arranged in the portable information terminal, the device, etc., and the repetition can be stopped in accordance with necessity.

The correspondence of the construction of this invention and the above embodiment mode is set as follows.

The face authenticating device and the portable telephone of this invention correspond to the photographic subject authenticating device 1 of the embodiment mode.

Similarly, the control means corresponds to the controller of the photographic subject authenticating device 1.

The photographing means corresponds to the camera 12.

The input means corresponds to the operation button 16.

The authentication processing corresponds to steps n3 to n4.

The authentication repeating processing corresponds to step n7.

The repeating stoppage instruction receiving processing corresponds to step n9.

The true and false judgment processing corresponds to steps n9 to n10.

The repeating stoppage processing corresponds to steps n12 to n13.

The authentication restarting processing corresponds to step n13.

The repeating stoppage instructions correspond to the password input.

The normal instructions correspond to the registered password.

The predetermined timing corresponds to the time determined at random.

This invention is not limited to only the construction of the above embodiment mode, but many embodiment modes can be obtained.

What is claimed is:

1. A photographic subject authenticating device comprising photographing means for photographing a photographic subject, and performing authentication processing for authenticating the photographic subject based on photographic image provided by photographing the photographic subject by the photographing means;
the photographic subject authenticating device further comprising:
input means for receiving an input using the photographic subject; and
control means for controlling operations of the input means;
wherein the control means is constructed so as to execute:
authentication repeating processing for also repeatedly executing the authentication processing after it is judged as in conformity by said authentication processing;
repeating stoppage instruction receiving processing for receiving repeating stoppage instructions for stopping the repetition of said authentication processing by said input means;
true and false judgment processing for comparing the received repeating stoppage instructions with normal instructions registered in advance, and making true and false judgments; and
repeating stoppage processing for stopping said authentication repeating processing when the judging result of the true and false judgment processing is true.

2. The photographic subject authenticating device according to claim 1, wherein said control means is constructed so as to execute authentication restarting processing for restarting said authentication repeating processing when a restarting condition determined in advance is satisfied after said repeating stoppage processing is executed.

3. The photographic subject authenticating device according to claim 2, wherein said repeating stoppage instruction receiving processing is constructed so as to be executed after it is judged as in conformity by the authentication processing.

4. The photographic authenticating device according to claim 2, wherein said authentication repeating processing is constructed so as to irregularly repeat said authentication processing.

5. A face authenticating device comprising the photographic subject authenticating device according to claim 2, and constructed so as to photograph a face as the photographic subject by said photographing means.

6. A portable telephone comprising the photographic subject authenticating device according to claim 2.

7. The photographic subject authenticating device according to claim 1, wherein said repeating stoppage instruction receiving processing is constructed so as to be executed after it is judged as in conformity by the authentication processing.

8. The photographic authenticating device according to claim 7, wherein said authentication repeating processing is constructed so as to irregularly repeat said authentication processing.

9. A face authenticating device comprising the photographic subject authenticating device according to claim 7, and constructed so as to photograph a face as the photographic subject by said photographing means.

10. A portable telephone comprising the photographic subject authenticating device according to claim 7.

11. The photographic authenticating device according to claim 1, wherein said authentication repeating processing is constructed so as to irregularly repeat said authentication processing.

12. A face authenticating device comprising the photographic subject authenticating device according to claim 1, and constructed so as to photograph a face as the photographic subject by said photographing means.

13. A portable telephone comprising the photographic subject authenticating device according to claim 1.

14. A photographic subject authenticating method for performing authentication processing for authenticating a photographic subject based on a photographic image provided by photographing the photographic subject by photographing means, comprising:
repeatedly executing the authentication processing after it is judged as in conformity by said authentication processing;
receiving repeating stoppage instructions for stopping the repetition of said authentication processing by input means;
making true and false judgments by comprising the received repeating stoppage instructions with normal instructions registered in advance; and
stopping the repetition of said authentication processing when the judging result of the true and false judgments is true.

15. A photographic subject authentication program for performing authentication processing for authenticating a photographic subject based on a photographic image provided by photographing the photographic subject by photographing means,
the photographic subject authenticating program being constructed so as to execute:
authentication repeating processing for also repeatedly executing the authentication processing after it is judged as in conformity by said authentication processing;
repeating stoppage instruction receiving processing for receiving repeating stoppage instructions for stopping the repetition of said authentication processing by input means;
true and false judgment processing for comparing the received repeating stoppage instructions with normal instructions registered in advance, and making true and false judgments; and
repeating stoppage processing for stopping said authentication repeating processing when the judging result of the true and false judgment processing is true.

* * * * *